United States Patent
Lee et al.

(10) Patent No.: US 10,851,882 B2
(45) Date of Patent: Dec. 1, 2020

(54) DAMPER CONFIGURATIONS FOR A HYBRID VEHICLE POWERTRAIN HAVING A MOTOR COUPLED BETWEEN AN ENGINE AND A TRANSMISSION WITH A ONE-WAY CLUTCH COUPLING THE ENGINE TO THE TRANSMISSION

(71) Applicant: GM Global Technology Operations LLC, Detroit, MI (US)

(72) Inventors: Chunhao J. Lee, Troy, MI (US); Farzad Samie, Franklin, MI (US); Derek F. Lahr, Howell, MI (US); Norman K. Bucknor, Troy, MI (US); Dongxu Li, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 74 days.

(21) Appl. No.: 16/165,346

(22) Filed: Oct. 19, 2018

(65) Prior Publication Data
US 2020/0124152 A1    Apr. 23, 2020

(51) Int. Cl.
| F16H 45/02 | (2006.01) |
| F16H 41/24 | (2006.01) |
| F16D 41/12 | (2006.01) |
| F16F 15/123 | (2006.01) |
| F16D 41/04 | (2006.01) |

(52) U.S. Cl.
CPC .............. *F16H 45/02* (2013.01); *F16D 41/04* (2013.01); *F16D 41/12* (2013.01); *F16F 15/1232* (2013.01); *F16H 41/24* (2013.01); *F16H 2041/246* (2013.01); *F16H 2045/0221* (2013.01)

(58) Field of Classification Search
CPC .......... B60K 17/02; B60K 17/26; B60K 6/38; B60K 6/383; B60K 6/387; B60K 2006/4825; F16D 41/04; F16D 41/24; F16D 41/12; F16D 47/00; F16D 47/02; F16D 47/04; F16D 47/06; F16F 15/1232; F16H 41/04; F16H 2041/246
See application file for complete search history.

(56) References Cited

U.S. PATENT DOCUMENTS

| 5,789,823 A * | 8/1998 | Sherman ................. F16H 61/62 290/47 |
| 7,198,587 B2 | 4/2007 | Samie et al. |

(Continued)

OTHER PUBLICATIONS

Samie et al.; U.S. Appl. No. 16/000,879 entitled "Powertrain Coupling, Clutch, and Torque Converter"; filed Jun. 5, 2018; 17 pages.

(Continued)

*Primary Examiner* — Jacob S. Scott
*Assistant Examiner* — Lori Wu (57) ABSTRACT

A powertrain system includes a flex plate, a transmission input shaft, a torque coupling, a one-way clutch, and a damper assembly. The flex plate is configured to be connected to a crankshaft of an engine. The torque coupling connects the transmission input shaft to the flex plate while allowing slip between the transmission input shaft and the flex plate. The one-way clutch is configured to couple the flex plate to the torque coupling. The damper assembly couples the flex plate to the one-way clutch and is configured to inhibit vibration transmission from the flex plate to the one-way clutch.

19 Claims, 8 Drawing Sheets

(56) References Cited

U.S. PATENT DOCUMENTS

| | | |
|---|---|---|
| 8,029,403 B2 | 10/2011 | Lee et al. |
| 8,494,738 B2 | 7/2013 | Lee et al. |
| 10,017,044 B2 | 7/2018 | Lahr et al. |
| 2003/0119623 A1 | 6/2003 | Stevenson et al. |
| 2004/0235608 A1 | 11/2004 | Borgerson et al. |
| 2005/0130789 A1 | 6/2005 | Samie et al. |
| 2005/0132701 A1* | 6/2005 | Rose ................... F15B 1/027 60/413 |
| 2007/0099758 A1 | 5/2007 | Maguire et al. |
| 2008/0149067 A1 | 6/2008 | Kimes |
| 2008/0168964 A1 | 7/2008 | Kimura et al. |
| 2008/0223681 A1 | 9/2008 | Stevenson et al. |
| 2008/0300093 A1 | 12/2008 | Borgerson |
| 2009/0084653 A1 | 4/2009 | Holmes |
| 2009/0143180 A1 | 6/2009 | Shimizu et al. |
| 2009/0194381 A1 | 8/2009 | Samie et al. |
| 2009/0211863 A1 | 8/2009 | Kimes |
| 2009/0233761 A1 | 9/2009 | Dickinson |
| 2010/0018795 A1 | 1/2010 | Samie et al. |
| 2010/0022342 A1 | 1/2010 | Samie et al. |
| 2010/0022343 A1 | 1/2010 | Samie et al. |
| 2010/0063693 A1 | 3/2010 | Lee et al. |
| 2010/0063694 A1 | 3/2010 | Lee et al. |
| 2010/0063698 A1 | 3/2010 | Lee et al. |
| 2010/0105521 A1 | 4/2010 | Kondo et al. |
| 2010/0197457 A1 | 8/2010 | Kuwahara et al. |
| 2010/0317487 A1 | 12/2010 | Cullen et al. |
| 2011/0011694 A1 | 1/2011 | Swales et al. |
| 2011/0024210 A1 | 2/2011 | Holmes et al. |
| 2011/0154944 A1* | 6/2011 | Mueller ................ F15B 1/027 60/413 |
| 2011/0238275 A1 | 9/2011 | Watanabe et al. |
| 2017/0328456 A1 | 11/2017 | Samie et al. |
| 2018/0313414 A1* | 11/2018 | Finkenzeller .......... F16D 47/00 |

OTHER PUBLICATIONS

Bock et al.; U.S. Appl. No. 15/653,852 entitled "System and Method for Controlling a Damper Bypass Clutch to Provide Friction Damping in a Connection Between an Engine and a Transmission"; filed Jun. 19, 2017; 40 pages.

\* cited by examiner

DAMPER CONFIGURATIONS FOR A HYBRID VEHICLE POWERTRAIN HAVING A MOTOR COUPLED BETWEEN AN ENGINE AND A TRANSMISSION WITH A ONE-WAY CLUTCH COUPLING THE ENGINE TO THE TRANSMISSION

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to damper configurations for a hybrid vehicle powertrain having a motor coupled between an engine and a transmission with a one-way clutch coupling the engine to the transmission.

A parallel hybrid vehicle has an internal combustion engine and an electric machine (e.g., a motor-generator) that can individually drive the vehicle or be coupled to one another to collectively drive the vehicle. The powertrain configurations for parallel hybrid vehicles are categorized as P0, P1, P2, P3, or P4. In the P0 configuration, the electric machine is connected to the front of the engine, usually through a serpentine belt. If the engine is connected through a belt, the P0 configuration is sometimes referred to as a belted alternator starter. In the P1 configuration, the electric machine is directly coupled to the crankshaft of the engine at the rear of the engine and forward of the transmission. In the P2 configuration, the electric machine is coupled to the transmission input. In the P3 configuration, the electric machine is directly connected to the transmission output. In the P4 configuration, the electric machine is directly connected to the non-engine driven axle of the vehicle through gears.

In the P2, P3, or P4 configurations, the engine can be disconnected from the rest of the powertrain to avoid friction losses. However, in the P3 and P4 configurations, the gear ratio between the electric machine and the vehicle's wheels is typically fixed. In contrast, the P2 configuration not only provides the ability to disconnect the engine from the rest of the powertrain, but it also provides the ability to vary the gear ratio between the electric machine and the vehicle's wheels.

In some parallel hybrids having the P2 configuration, the electric machine is directly connected to a pump of a torque converter, and a one-way clutch (OWC) or a selectable one-way clutch (SOWC) is used to couple/decouple the engine to/from the torque converter. A OWC transfers torque in only one direction (e.g., an engine drive torque direction). A SOWC is actuatable between a first configuration and a second configuration. In the first configuration, the SOWC transfers torque in only a first direction (e.g., an engine drive torque direction). In the second configuration, the SOWC transfers torque in the first direction and a second direction opposite of the first direction, albeit at different times.

SUMMARY

A first example of a powertrain system according to the present disclosure includes a flex plate, a transmission input shaft, a torque coupling, a one-way clutch, and a first damper assembly. The flex plate is configured to be connected to a crankshaft of an engine. The torque coupling connects the transmission input shaft to the flex plate while allowing slip between the transmission input shaft and the flex plate. The one-way clutch is configured to couple the flex plate to the torque coupling. The first damper assembly couples the flex plate to the one-way clutch and is configured to inhibit vibration transmission from the flex plate to the one-way clutch.

In one example, the powertrain system further includes a motor-generator connected to an input side of the torque coupling.

In one example, the first damper assembly includes an input drive plate connected to the flex plate, a spring retainer plate connected to the one-way clutch, and a coil spring captured between the input drive plate and the spring retainer plate and configured to transfer torque from the input drive plate to the spring retainer plate.

In one example, the input drive plate includes radially extending arms, and the spring retainer plate retains the coil spring between the radially extending arms of the input drive plate.

In one example, the one-way clutch is a selectable one-way clutch.

In one example, the selectable one-way clutch is actuatable between a first configuration and a second configuration. In the first configuration, the selectable one-way clutch transfers torque from the flex plate to the torque coupling in a first direction and does not transfer torque from the torque coupling to the flex plate in a second direction that is opposite than the first direction. In the second configuration, the selectable one-way clutch transfers torque from the flex plate to the torque coupling in the first direction and transfers torque from the torque coupling to the flex plate in the second direction.

In one example, the torque coupling is a torque converter that includes a pump and a turbine that are hydraulically coupled to one another, and the powertrain system further includes a second damper assembly coupling the pump of the torque converter to the transmission input shaft and configured to inhibit vibration transmission from the pump to the transmission input shaft.

In one example, the torque converter further includes a torque converter clutch configured to mechanically couple the pump of the torque converter to the transmission input shaft, and the second damper assembly couples the torque converter clutch to the transmission input shaft.

In one example, the one-way clutch is configured to couple the flex plate to the torque coupling when a speed of the engine is greater than or equal to a speed of a component on an input side of the torque coupling.

In one example, the one-way clutch transfers torque from the flex plate to the torque coupling in a first direction, and does not transfer torque from the torque coupling to the flex plate in a second direction that is opposite than the first direction.

In one example, the powertrain system further includes a friction clutch connected to the flex plate and the torque coupling in parallel with the one-way clutch and configured to couple the flex plate to the torque coupling when the friction clutch is engaged.

In one example, the powertrain system further includes a second damper assembly coupling an input side of the torque coupling to the transmission input shaft and configured to inhibit transmission of vibration from the engine to the transmission input shaft.

In one example, the torque coupling is a torque converter that includes a pump, a turbine hydraulically coupled to the pump, and a torque converter clutch configured to mechanically couple the pump of the torque converter to the transmission input shaft, and the second damper assembly couples the torque converter clutch to the transmission input shaft.

A second example of a powertrain system according to the present disclosure includes a flex plate configured to be connected to a crankshaft of an engine, a transmission input shaft, a torque converter connecting the transmission input shaft to the flex plate and including a pump and a turbine that is hydraulically coupled to the pump, a motor-generator connected to the pump of the torque converter, a one-way clutch configured to couple the flex plate to the torque converter, and a damper assembly coupling the pump of the torque converter to the transmission input shaft and configured to inhibit vibration transmission from the pump to the transmission input shaft.

In one example, the torque converter further includes a torque converter clutch configured to mechanically couple the pump of the torque converter to the transmission input shaft, and the damper assembly couples the torque converter clutch to the transmission input shaft.

In one example, the one-way clutch is a selectable one-way clutch.

In one example, the powertrain system further includes a friction clutch connected to the flex plate and the torque converter in parallel with the one-way clutch and configured to couple the flex plate to the torque converter when the friction clutch is engaged.

A third example of a powertrain system according to the present disclosure includes a flex plate configured to be connected to a crankshaft of an engine, a transmission input shaft, a torque converter connecting the transmission input shaft to the flex plate and including a pump and a turbine that is hydraulically coupled to the pump, a motor-generator connected to the pump of the torque converter, a one-way clutch configured to couple the flex plate to the torque converter, and a first damper assembly coupling the flex plate to the one-way clutch and configured to inhibit vibration transmission from the flex plate to the one-way clutch.

In one example, the torque converter further includes a torque converter clutch configured to mechanically couple the pump of the torque converter to the transmission input shaft.

In one example, the powertrain system further includes a second damper assembly coupling the torque converter clutch to the transmission input shaft and configured to inhibit vibration transmission from the torque converter clutch to the transmission input shaft.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

As discussed above, some parallel hybrids having a P2 configuration include a OWC or SOWC that couple/decouple the engine to/from the torque converter. The OWC or SOWC typically includes a pocket plate fixed to a pump of the torque converter, a notch plate fixed to a flex plate of the engine, and a plurality of struts pivotally connected to a side surface of the pocket plate that opposes the notch plate. When the speed of the engine is greater than or equal to the speed of the pump, the struts pivot into and engage notches in the notch plate to connect the pocket plate to the notch plate. As a result, the OWC or SOWC transfers torque from the engine to the torque converter.

When the OWC or SOWC is engaging, vibration resulting from firing pulses in the engine or oscillations in the driveline may cause damage to the OWC or SOWC. For example, as the struts on the pocket plate engage notches in the notch plate, the struts may be damaged by fluctuations in the speed of the engine relative to the speed of the pump due to engine or driveline vibration. In other OWCs and SOWCs, pawls, rollers, or dog clutch components are used in place of the struts to connect the pocket plate to the notch plate, and these other components may also be damaged by engine vibration. In addition, engine vibration transmitted to the driveline may cause undesired noise.

To address these issues, a hybrid powertrain system according to the present disclosure includes a damper assembly between the engine and the OWC or SOWC and/or a damper assembly between the pump of the torque converter and the driveline. The damper assembly includes one or more damper springs that transfer torque between the engine and the OWC or SOWC, or between the pump and the driveline, while allowing some relative movement between the engine and the OWC or SOWC, or between the pump and the driveline. Thus, the damper assembly inhibits the transmission of vibration between the engine and the OWC or SOWC, or between the pump and the driveline, to protect and isolate the OWC or SOWC.

Figure 1:
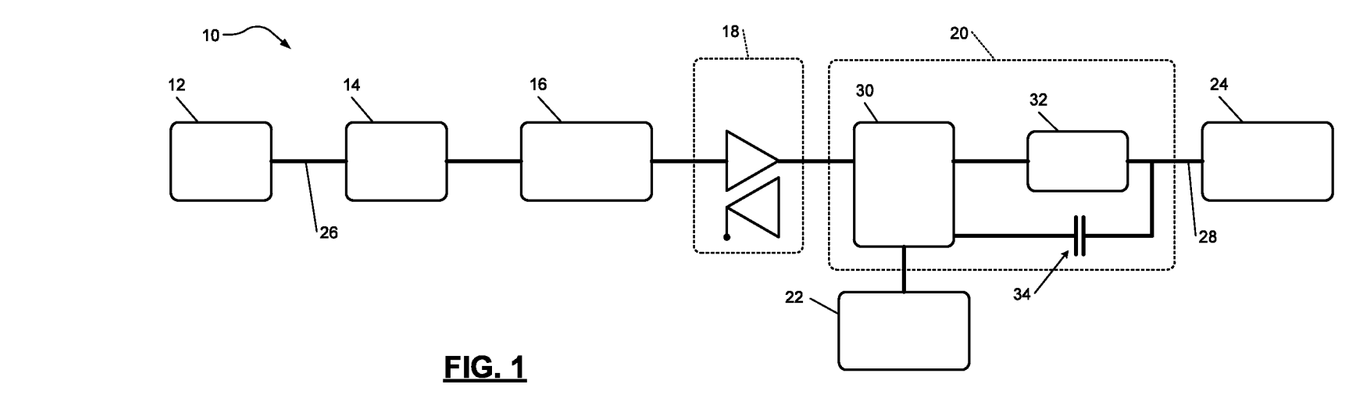
FIG. 1-6 are functional block diagrams of hybrid powertrain systems according to the principles of the present disclosure.

Referring now to FIG. 1, a hybrid powertrain system 10 includes an engine 12, a flex plate 14, a damper assembly 16, a selectable one-way clutch (SOWC) 18, a torque converter 20, a motor-generator 22, and a transmission 24. The engine 12 combusts a mixture of air and fuel to produce drive torque. The engine 12 includes a crankshaft 26 that rotates as a result of combustion of the air/fuel mixture within the engine 12.

The flex plate 14 is rigidly connected to the crankshaft 26 of the engine 12 using, for example, fasteners. Thus, the flex plate 14 rotates with the crankshaft 26 at the same speed as the crankshaft 26. The damper assembly 16 couples the flex plate 14 to the SOWC 18 and inhibits the transmission of engine vibration from the flex plate 14 to the SOWC 18 to protect the SOWC 18 from damage caused by engine vibration. The damper assembly 16 is rigidly connected to each of the flex plate 14 and the SOWC 18 using, for example, fasteners, while providing a flexible connection between the flex plate 14 and the SOWC 18 (i.e., a connection that is flexible in the torsional or rotational direction of the hybrid powertrain system 10).

The SOWC 18 is actuatable between a first configuration and a second configuration. In the first configuration, the SOWC 18 transfers torque from the flex plate 14 to the torque converter 20 in a first direction and does not transfer torque from the torque converter 20 to the flex plate 14 in a second direction that is opposite than the first direction. The SOWC 18 automatically couples the flex plate 14 to the torque converter 20 to transfer torque in the first direction when the speed of the engine 12 is greater than or equal to the speed of the pump 30.

In the second configuration, the SOWC 18 transfers torque from the flex plate 14 to the torque converter 20 in a first direction and transfers torque from the torque converter 20 to the flex plate 14 in the second direction. The SOWC 18 automatically couples the flex plate 14 to the torque converter 20 to transfer torque in the second direction when the speed of the pump 30 is greater than or equal to the speed of the engine 12. Torque transfer from the flex plate 14 to the torque converter 20 in the first direction may cause a vehicle to move forward. Torque transfer from the torque converter 20 to the flex plate 14 in the second direction may be used to start the engine 12 or decrease the speed of the vehicle via engine braking.

Operation of the SOWC 18 in the first configuration may be referred to as a lock-free mode since the SOWC 18 is locked for torque transfer in the first direction and is free spinning (i.e., not locked for torque transfer) in the second direction. Operation of the SOWC 18 in the second configuration may be referred to as a lock-lock mode since the SOWC 18 is locked for torque transfer in both the first and second directions. In various implementations, the SOWC 18 may operate in a free-free mode or a free-lock mode. In the free-free mode, the SOWC 18 is free spinning in both the first and second directions. In the free-lock mode, the SOWC 18 is free spinning in the first direction and is locked for torque transfer in the second direction.

The torque converter 20 connects an input shaft 28 of the transmission 24 to the flex plate 14 by connecting the transmission input shaft 28 to the SOWC 18. The torque converter 20 is operable to allow some slip between the transmission output shaft 28 and the flex plate 18 at certain times, such as during a vehicle launch. In various implementations, the torque converter 20 may be replaced with another torque coupling, such as a friction clutch, that couples the transmission input shaft 28 to the flex plate 14 while allowing some slip therebetween. The torque converter 20 includes a pump 30, a turbine 32 that is hydraulically coupled to the pump 30, and a clutch 34. The pump 30 is rigidly connected to the SOWC 18 using, for example, fasteners. The turbine 32 is rigidly connected to the transmission input shaft 28 using, for example, a spline connection and/or fasteners.

The torque converter clutch 34 is connected to the pump 30 and the transmission input shaft 28 in parallel with the turbine 32. The torque converter clutch 34 mechanically couples the pump 30 to the transmission input shaft 28 when the torque converter clutch is applied. When the torque converter clutch 34 is fully engaged, the torque converter clutch 34 provides a rigid connection between the pump 30 and the transmission input shaft 28, thereby bypassing the fluid coupling between the pump 30 and the turbine 32. The torque converter clutch 34 may be a friction clutch that engages and disengages in response to the pressure of hydraulic fluid supplied to the torque converter clutch 34. The clutch control valve may adjust the pressure of hydraulic fluid supplied to the torque converter clutch 34 in response to a clutch control signal output by a clutch control module (not shown).

The motor-generator 22 is connected between the engine 12 and the transmission 24. In this regard, the hybrid powertrain system 10 may be referred to as having a P2 hybrid configuration. In the example shown in FIG. 1, the motor-generator 22 is directly connected to the pump 30 (i.e., the input side of the torque converter 20). The motor-generator 22 may be connected to the pump 30 with a desired gear ratio therebetween using, for example, a belt, pulleys, a chain, gears, or a combination of one or more of the aforementioned components. The motor-generator 22 is operable to use power supplied by the battery to drive the pump 30 or to use engine drive torque transferred to the pump 30 to generate electricity and thereby charge the battery.

The transmission 24 transfers torque from the transmission input shaft 28 to a transmission output shaft (not shown) at one or more gear ratios. The transmission 24 may be an automatic transmission. The transmission output shaft may be connected to a driveline (not shown) of the vehicle. The driveline may transfer torque from the transmission output shaft to wheels (not shown) of the vehicle to propel the vehicle. The driveline may also transfer torque from the wheels to the transmission output shaft when, for example, the vehicle is coasting.

Figure 2:
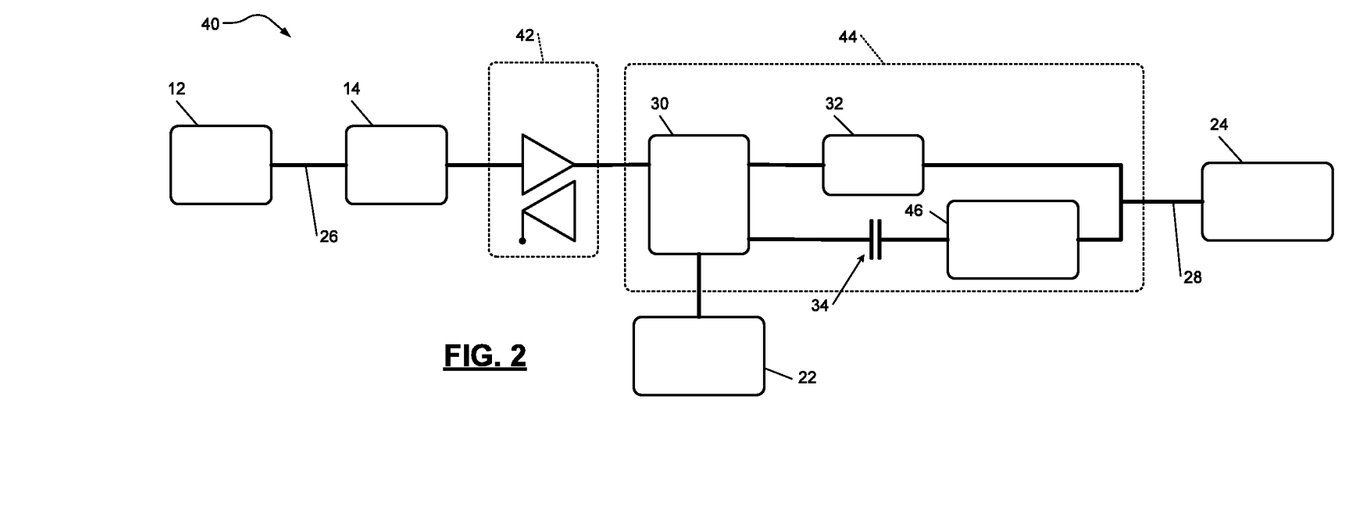

Referring now to FIG. 2, a hybrid powertrain system 40 is similar or identical to the hybrid powertrain system 10 of FIG. 1 except that the hybrid powertrain system 40 does not include the damper assembly 16. In addition, the hybrid powertrain system 40 includes a SOWC 42 and a torque converter 44 in place of the SOWC 18 and the torque converter 20, respectively.

The SOWC 42 of the hybrid powertrain system 40 is similar or identical to the SOWC 18 of the hybrid powertrain system 10 except that the SOWC 42 may have less lash than the SOWC 18. For example, the SOWC 18 may have one degree of lash, and the SOWC 42 may have zero degrees of lash. Thus, the SOWC 42 may not be damaged by engine vibration caused by engine firing pulses or pumping pulsations even though the hybrid powertrain system 40 does not include the damper assembly 16 to protect the SOWC 42 from engine vibration.

The torque converter 44 is similar to the torque converter 20 except that the torque converter 44 includes a damper assembly 46. The damper assembly 46 couples the pump 30 to the transmission input shaft 28 by coupling the torque converter clutch 34 to the transmission input shaft 28. In addition, the damper assembly 46 provides a flexible connection on the driveline side of the SOWC 42 to protect the SOWC 42 from engine vibration. In this regard, the damper assembly 46 absorbs engine vibration that would otherwise be absorbed by, and possibly damage, the SOWC 42.

Figure 3:
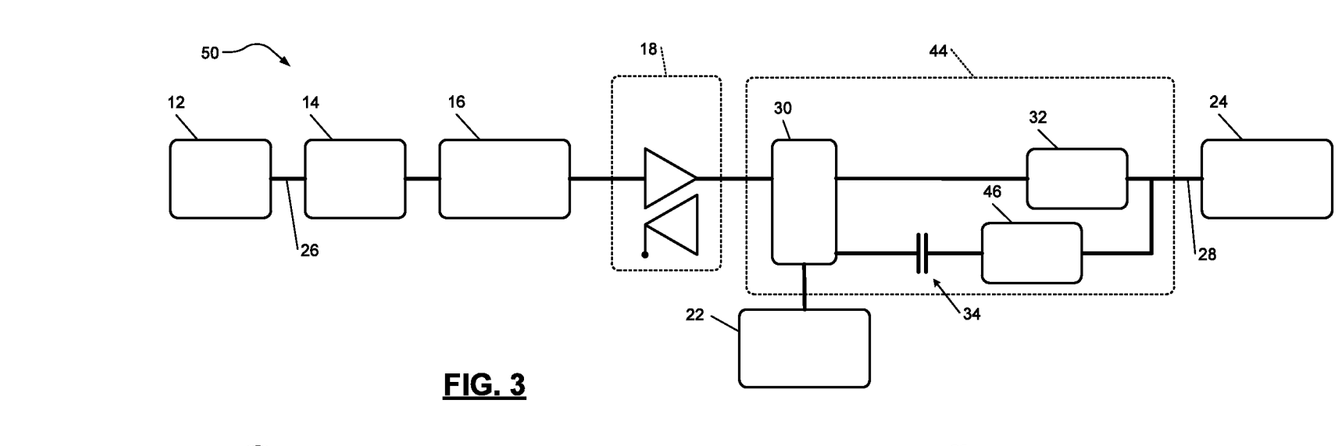

Referring now to FIG. 3, a hybrid powertrain system 50 is similar or identical to the hybrid powertrain system 10 of FIG. 1 except that the hybrid powertrain system 50 includes the torque converter 44 in place of the torque converter 20. Thus, while the hybrid powertrain system 10 includes only a single damper (i.e., the damper assembly 16), the hybrid powertrain system 50 includes two dampers (i.e., the damper assemblies 16 and 46). Therefore, the hybrid powertrain system 10 may be referred to as having a single damper configuration, and the hybrid powertrain system 50 may be referred to as having a duel damper configuration.

In the single damper configuration of FIG. 1, the size of the torque converter 20 may be reduced relative to the size of the torque converter 44 since the torque converter 20 does not include the damper assembly 46. However, the dampening characteristics (e.g., spring rate) of the damper assembly 46 may be designed to protect the SOWC 18 from multiple orders or frequency ranges of engine vibration and to isolate the driveline from engine vibration. Thus, compromises may be made in the design of the damper assembly 46. In the dual damper configuration of FIG. 3, the damper assembly 16 may be designed to protect the SOWC 18 from one order (e.g., a first order) or frequency range of engine vibration, and the damper assembly 46 may be designed to isolate the SOWC 18 from one or more other orders (e.g., a second order, a second order, a third order) or frequency ranges of engine vibration and to isolate the driveline from engine vibration. Thus, the damper assemblies 16 and 26 may protect/isolate the SOWC 18 and the driveline more effectively than the damper assembly 16 alone.

Figure 4:
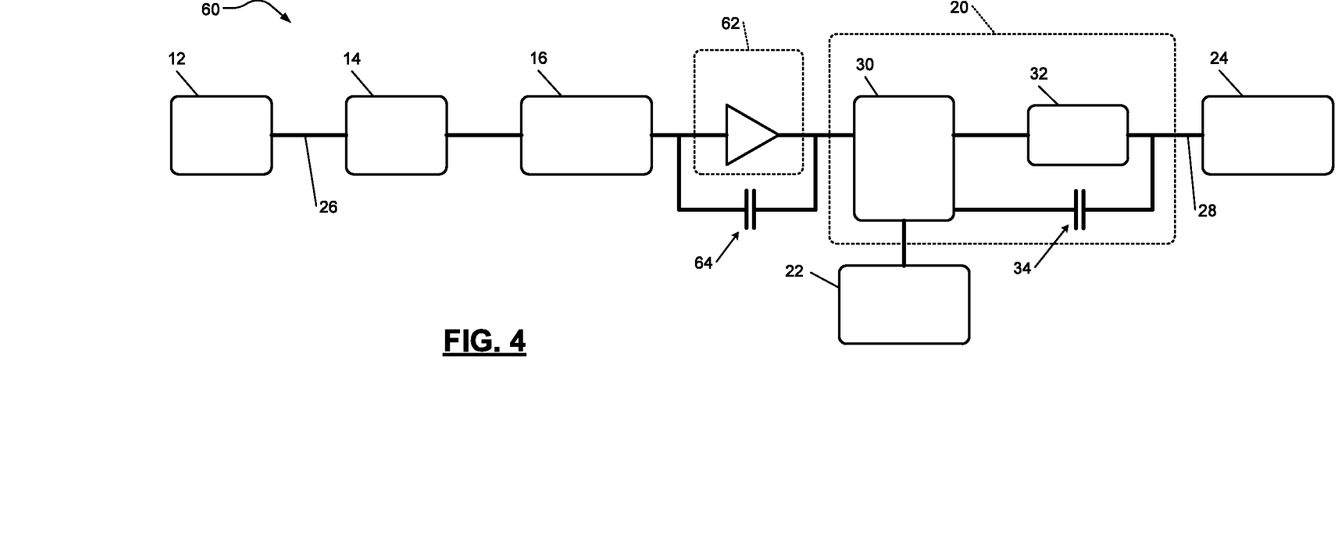

Referring now to FIG. 4, a hybrid powertrain system 60 is similar or identical to the hybrid powertrain system 10 of FIG. 1 except that the hybrid powertrain system 60 includes a one-way clutch (OWC) 62 in place of the SOWC 18. In addition, the hybrid powertrain system 60 includes a friction clutch 64 connected to the damper assembly 16 and the torque converter 44 in parallel with the OWC 62.

The OWC 62 transfers torque from the flex plate 14 to the torque converter 20 in the first direction. The OWC 62 automatically couples the flex plate 14 to the torque converter 20 to transfer torque in the first direction when the speed of the engine 12 is greater than or equal to the speed of the pump 30. The OWC 62 does not transfer torque from the torque converter 20 to the flex plate 14 in the second direction. In addition, the OWC 62 is not selectable. Thus, the OWC 62 does not transfer torque from the torque converter 20 to the flex plate 14 in the second direction under any condition.

When the friction clutch 64 is engaged, the friction clutch 64 provides a rigid connection between the damper assembly 16 and the torque converter 44. Thus, the friction clutch 64 is operable to transfer torque between the flex plate 14 and the torque converter 44 in either of the first and second directions, albeit at different times. The friction clutch 64 engages and disengages in response to the pressure of hydraulic fluid supplied to the friction clutch 64. The clutch control valve may adjust the pressure of hydraulic fluid supplied to the friction clutch 64 in response to a control signal output by the clutch control module.

In contrast to the hybrid powertrain system 10 of FIG. 1, the hybrid powertrain system 60 of FIG. 4 may require a hydraulic control system to actuate the friction clutch 64. In addition, there may be a delay period (e.g., one second) between a first time when a signal is output to engage the friction clutch and a second time when the friction clutch 64 engages in response to that signal. Thus, it may take longer to engage the engine 12 using the friction clutch 64 during, for example, an engine startup relative to the period required to engage the engine 12 using the SOWC 18.

However, as discussed above, the friction clutch 64 in the hybrid powertrain system 60 is operable to transfer torque between the flex plate 14 and the torque converter 44 in both the first and second directions. Thus, the clutch control module may engage the friction clutch 64 during periods when the OWC 62 is engaging, or is likely to engage, to prevent damage to the OWC 62 caused by lash in the OWC 62. In addition, the friction clutch 64 does not need to be designed to withstand the full torque capacity of the engine 12 since the OWC 62 is engaged when the engine 12 is driving the torque converter 20 at full torque capacity. For example, the friction clutch 64 may be designed to withstand only torque produced by the motor-generator 22, torque resulting from friction within the engine 12, and torque fluctuations resulting from engine firing pulses. Thus, the friction clutch 64 may be smaller than a typical friction clutch used in driveline applications.

Figure 5:
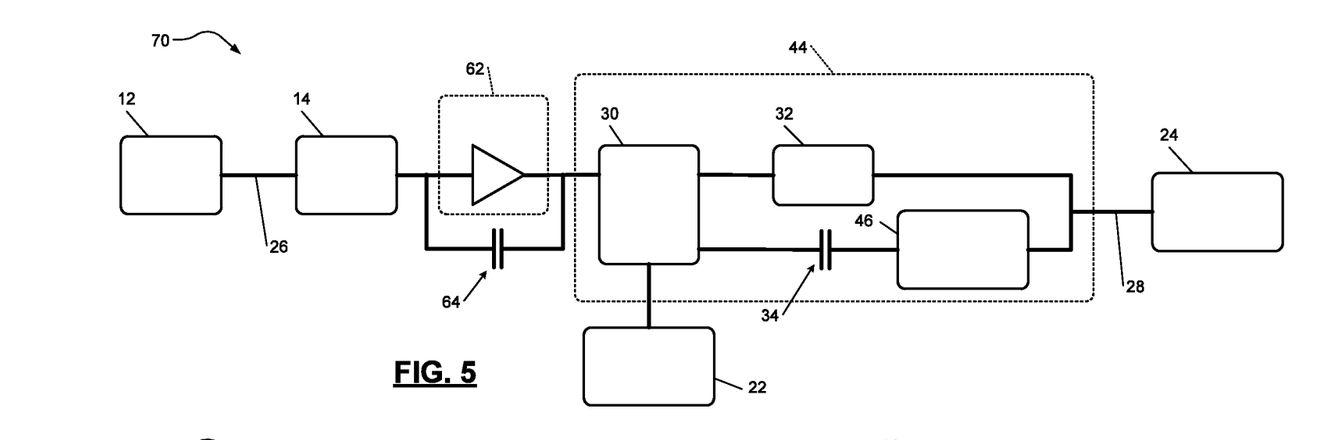

Referring now to FIG. 5, a hybrid powertrain system 70 is similar or identical to the hybrid powertrain system 60 of FIG. 4 except that the hybrid powertrain system 70 does not include the damper assembly 16. In addition, the hybrid powertrain system 70 includes the torque converter 44 in place of the torque converter 20. Thus, the hybrid powertrain system 70 of FIG. 5 is similar to the hybrid powertrain system 40 of FIG. 2 since the hybrid powertrain system 70 of FIG. 5 includes only the damper assembly 46 in the torque converter 44 with no damper assembly between the engine 12 and the OWC 62. However, the OWC 62 of FIG. 5 may have more lash than the SOWC 42 of FIG. 2 since the friction clutch 64 may be engaged to protect the OWC 62 from damage due to lash in the OWC 62. Further, the friction clutch 64 may be engaged between periods of the engine 12 providing drive torque since direction of torque transfer changes between those periods, and therefore the OWC 62 is likely to engage (and be damaged) between those periods.

Figure 6:
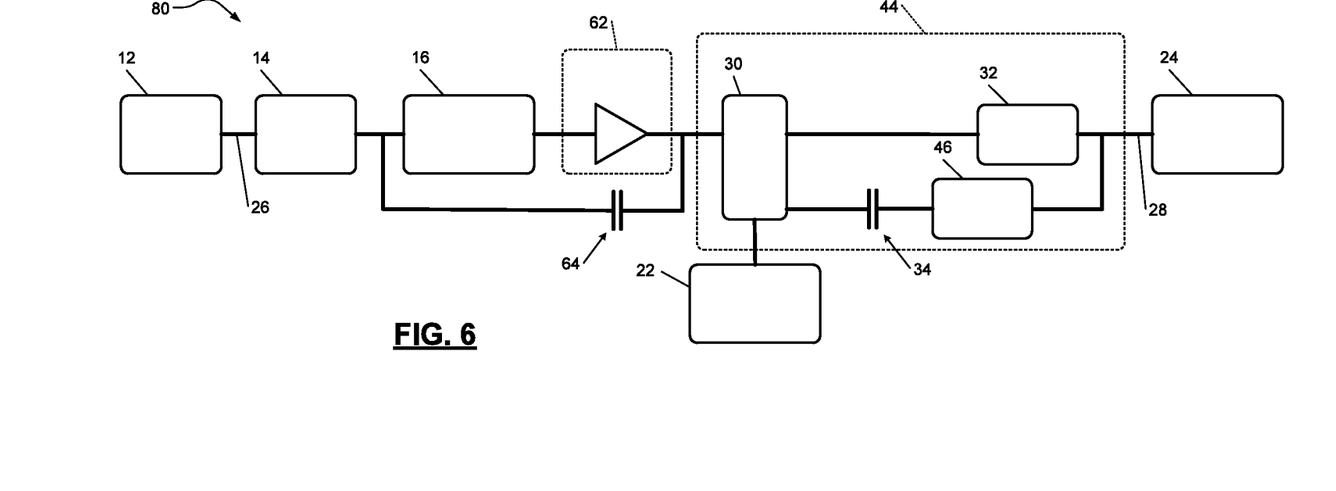

Referring now to FIG. 6, a hybrid powertrain system 80 is similar or identical to the hybrid powertrain system 60 of FIG. 4 except that the hybrid powertrain system 50 includes the torque converter 44 in place of the torque converter 20. Thus, while the hybrid powertrain system 60 includes only a single damper (i.e., the damper assembly 16), the hybrid powertrain system 80 includes two dampers (i.e., the damper assemblies 16 and 46). Therefore, the hybrid powertrain system 80 has the benefits of a dual damper configuration discussed above with reference to FIG. 3. In addition, the hybrid powertrain system 80 is similar or identical to the hybrid powertrain system 50 of FIG. 3 except that the hybrid powertrain system 80 includes the OWC 62 and the friction clutch 64 in place of the SOWC 18. Thus, the hybrid powertrain system 80 has the benefits of including the OWC 62 and the friction clutch 64 in place of the SOWC 18, which are discussed above with reference to FIG. 4.

Figure 7:
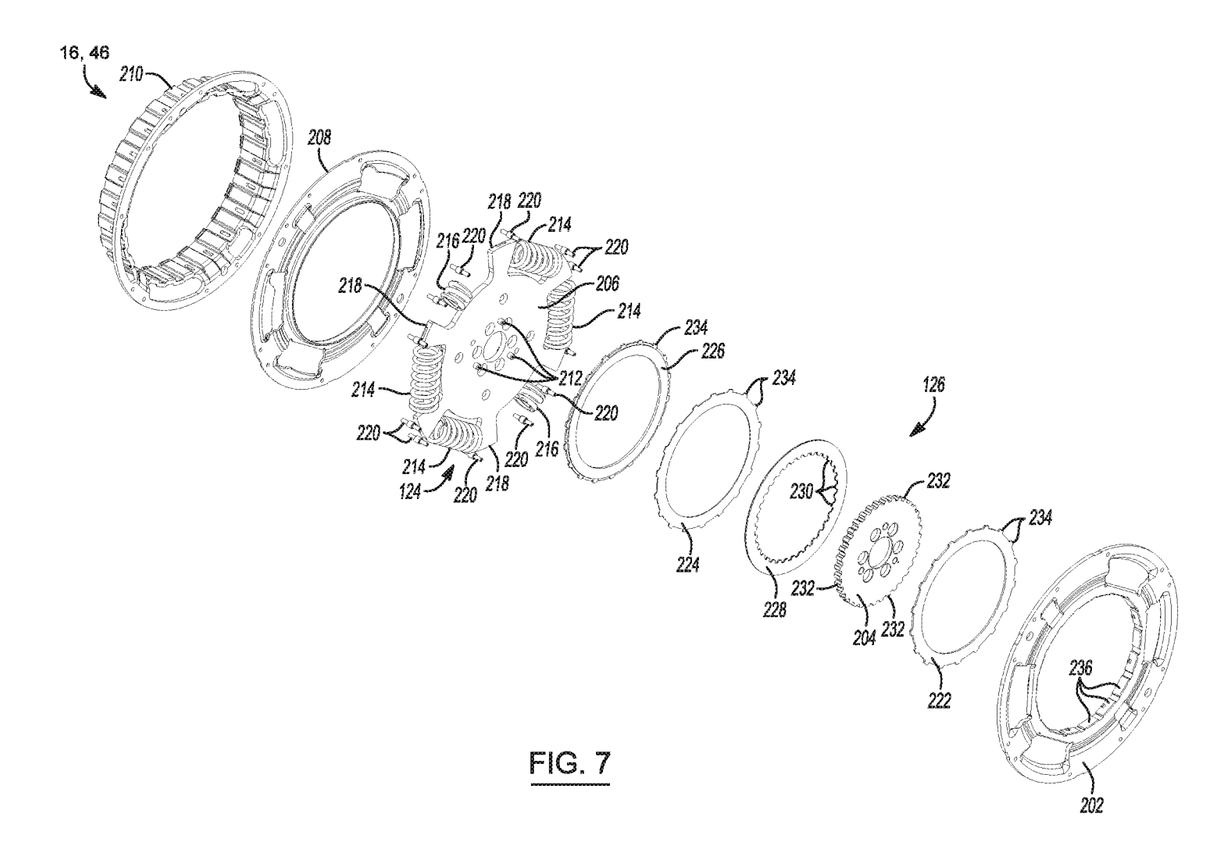
FIG. 7 is an exploded perspective view of a damper assembly according to the principles of the present disclosure.
Figure 8:
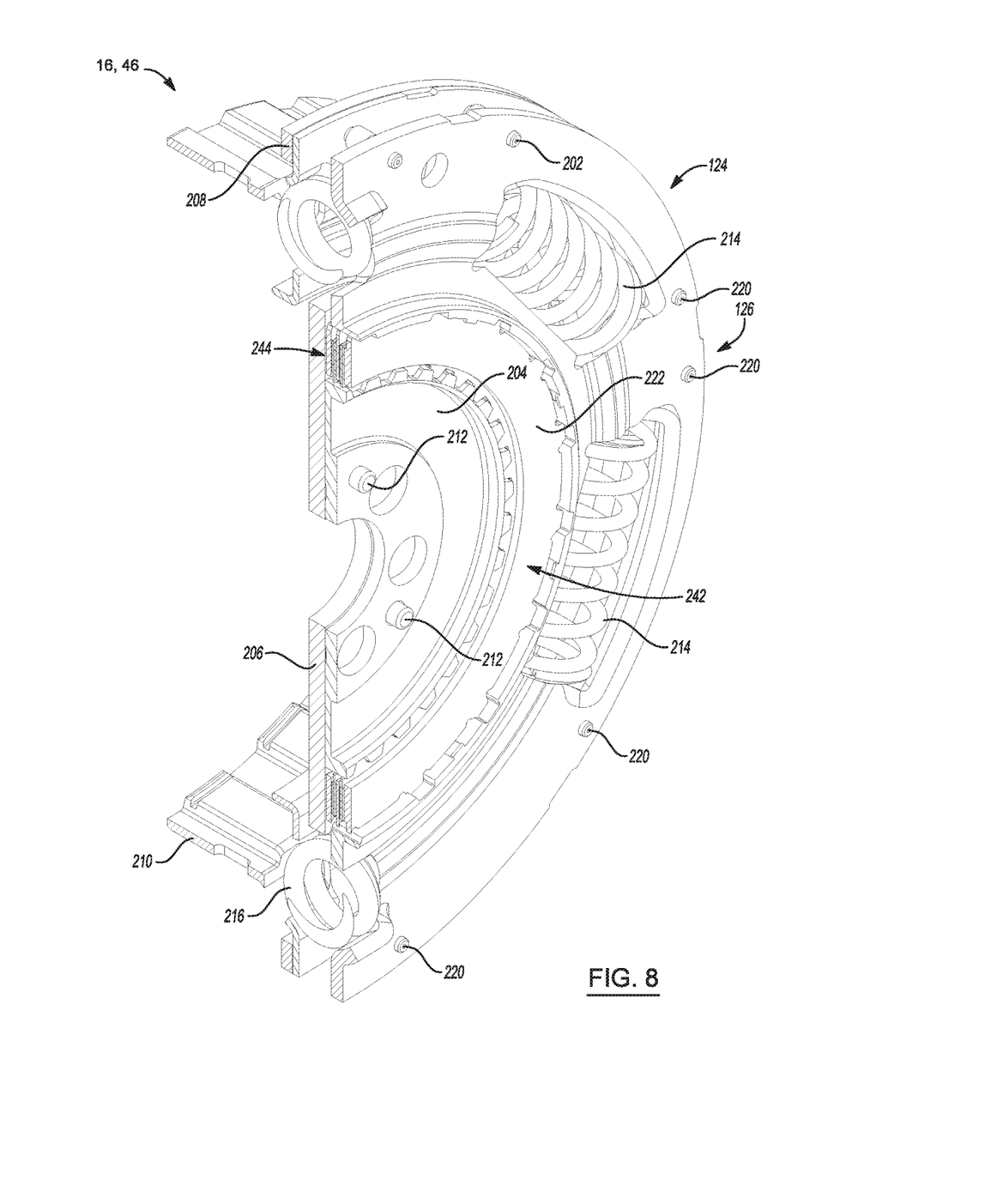
FIG. 8 is a sectioned perspective view of the damper assembly of FIG. 7.
Figure 9:
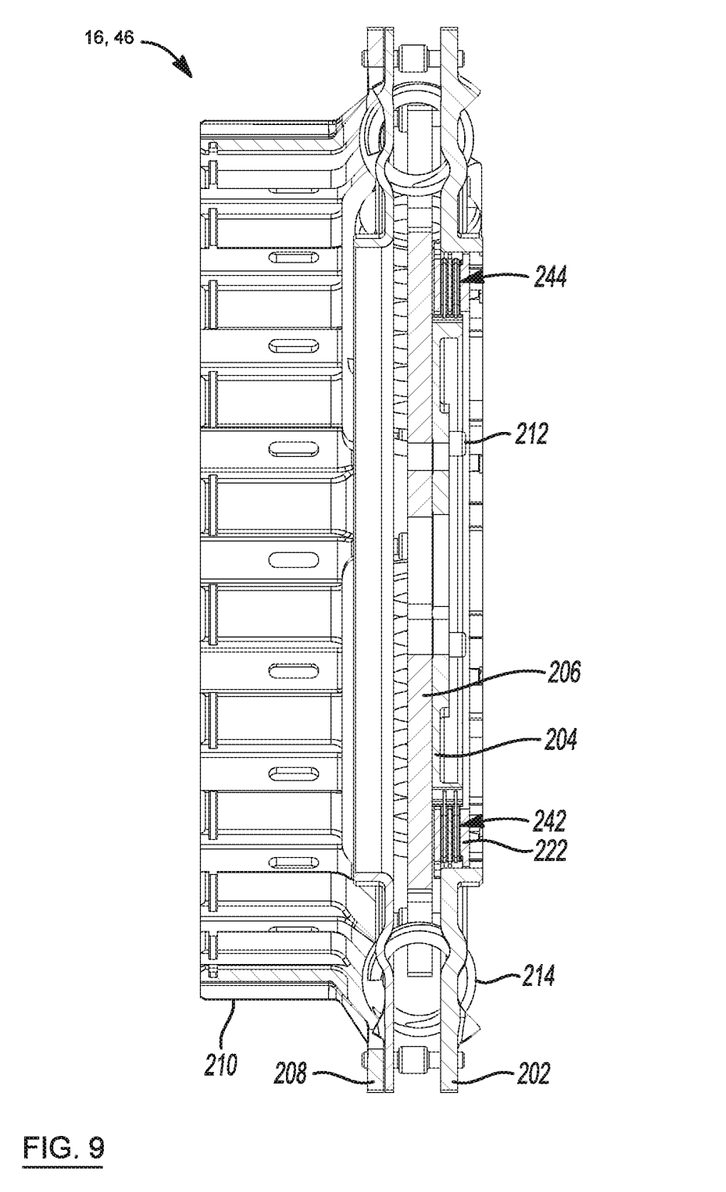
FIG. 9 is a cross-sectional view of the damper assembly of FIG. 7.

Referring now to FIGS. 7-9, an example implementation of each of the damper assemblies 16 and 46 includes a damper 124, a damper bypass clutch 126, a first spring retainer plate 202, an input hub 204, an input drive plate 206, a second spring retainer plate 208, and an input clutch housing 210. Although the example implementation is shown and described as including the damper bypass clutch 126, in various implementations, the damper bypass clutch 126 may be omitted. The input drive plate 206 of the damper assembly 16 may be connected to the flex plate 14 of the engine 12 (FIGS. 1-6). The input drive plate 206 of the damper assembly 46 may be connected to the friction clutch 64 (FIGS. 2, 3, 5, and 6). The input hub 204 is rotationally fixed to the input drive plate 206 using pins 212 such that the input hub 204 rotates with the input drive plate 206.

The damper 124 transfer engine torque output from the input drive plate 206 to the spring retainer plates 202, 208 and to the input clutch housing 210. The input clutch housing 210 of the damper assembly 16 may be coupled (e.g., bolted) to the SOWC 18 (FIGS. 1 and 3-6) or the SOWC 42 (FIG. 2). The input clutch housing 210 of the damper assembly 46 may be coupled (e.g., bolted) to the transmission input shaft 28 (FIGS. 1-6) or another component that is fixed to the transmission input shaft 28. The damper 124 includes first coil springs 214 and second coil springs 216. In various implementations, the damper 124 may include clock springs, pendulums, and/or polymer spacers in addition to or in place of the first and second coil springs 214 and 216. The second coil springs 216 may have a different rate and/or a different length than the first coil springs 214. The spring retainer plates 202, 208 retain the coil springs 214, 216 between radially extending arms 218 on the input drive plate 206. The first and second spring retainer plates 202 and 208 are riveted to each other and to the input clutch housing 120 using rivets 220.

The coil springs 214, 216 transfer torque from the input drive plate 206 to the spring retainer plates 202, 208. As the coil springs 214, 216 transfer torque from the input drive plate 206 to the spring retainer plates 202, 208, the coil springs 214, 216 compress and relax. This allows some relative angular motion between the input drive plate 206 and the spring retainer plates 202, 208, and thereby dampens engine and/or driveline vibration. In addition, the coil springs 214, 216 generate minimal torsional friction or hysteresis torque (e.g., less than 5 Nm).

The damper bypass clutch 126 includes a first friction plate 222, a second friction plate 224, a third friction plate 226, and a reaction plate 228. The friction plates 222, 224, 226 and the reaction plate 228 may be referred to collectively as a friction plate stack. The reaction plate 228 is splined to the input drive plate 206 via inner teeth 230 on the reaction plate 228 that engage outer teeth 232 on the input hub 204. The friction plates 222, 224, 226 are splined to the spring retainer plates 202, 208 and to the input clutch housing 210 via outer teeth 234 on the friction plates 222, 224, 226 that engage inner teeth 236 on the first spring retainer plate 202.

To fully engage the damper bypass clutch 126, a damper piston (not shown) applies a first force to a major surface 242 (FIGS. 3 and 4) of the first friction plate 222. In turn, the friction plate stack in the damper bypass clutch 126 compresses such that all of the input torque (e.g., engine or driveline torque) is transferred through the damper bypass clutch 126 and independent of the damper 124. The damper piston may apply the first force when the clutch control valve supplies hydraulic fluid at a first pressure to the damper bypass clutch 126.

To partially engage the damper bypass clutch 126, the damper piston applies a second force to the major surface 242 of the first friction plate 222. In turn, the friction plate stack partially decompresses such that some (e.g., most) of the input torque is transferred through the damper 124. In this state, the damper bypass clutch 126 applies a friction torque at an interface 244 (FIGS. 8 and 9) between the third friction plate 226 and the input drive plate 206. This friction torque provides hysteresis or coulomb damping that further reduces the amount of vibration transmitted through the damper assembly 16 or 46. The damper piston applies the second force when the clutch control valve supplies hydraulic fluid at the second pressure to the damper bypass clutch 126. The second force is less than the first force and, when the damper piston applies the second force to partially engage the damper bypass clutch 126, the second force is greater than zero.

Figure 10:
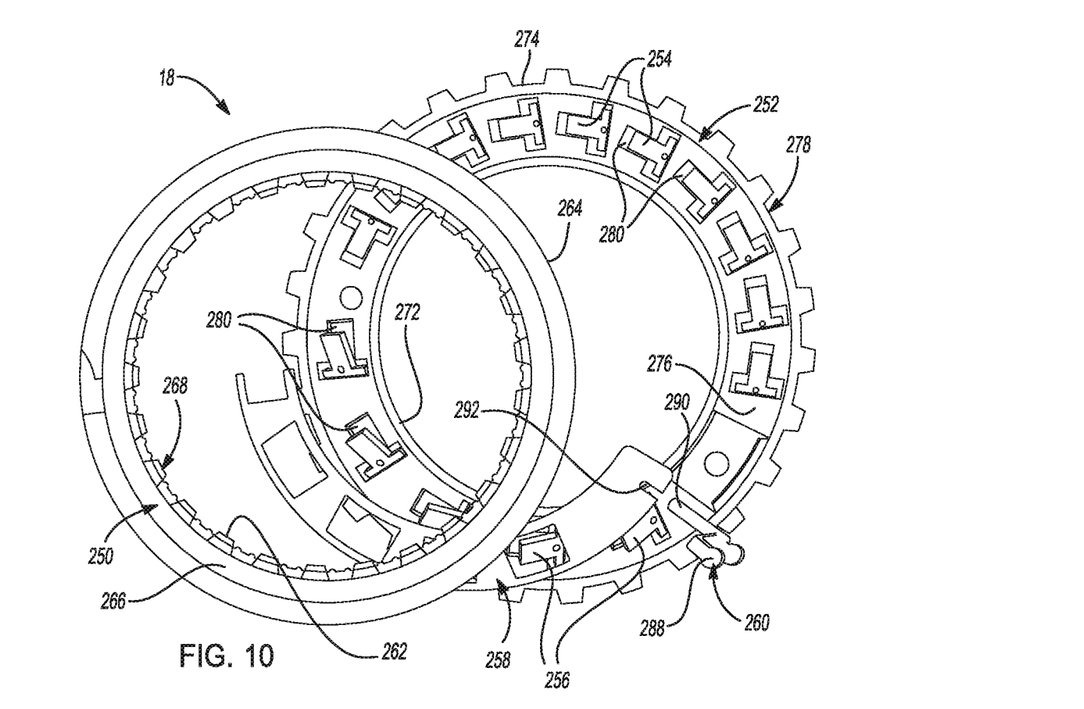
FIG. 10 is an exploded perspective view of a selectable one-way clutch according to the principles of the present disclosure.
Figure 11:
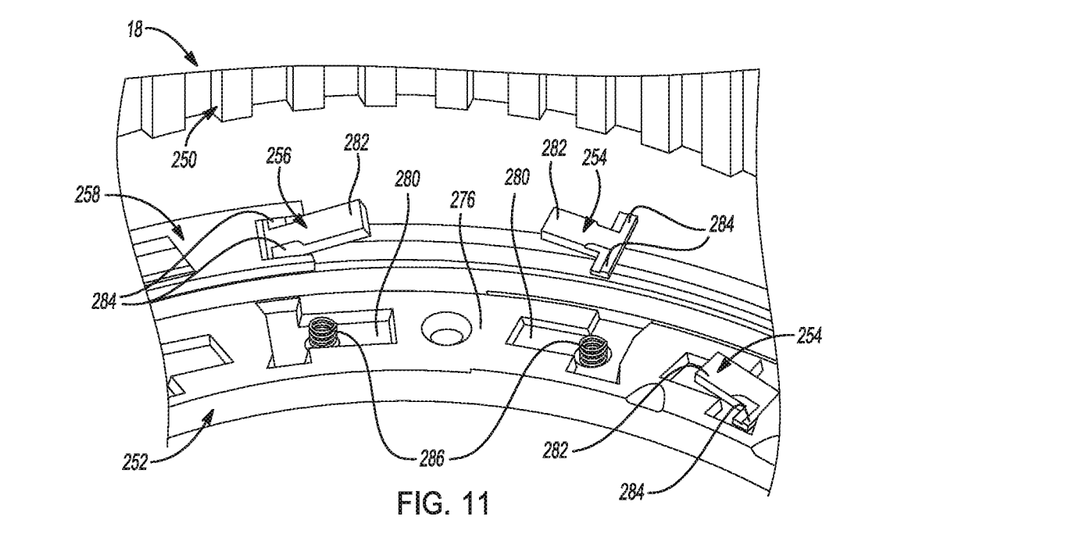
FIG. 11 is an enlarged perspective view of a portion of the selectable one-way clutch of FIG. 10.
Figure 12:
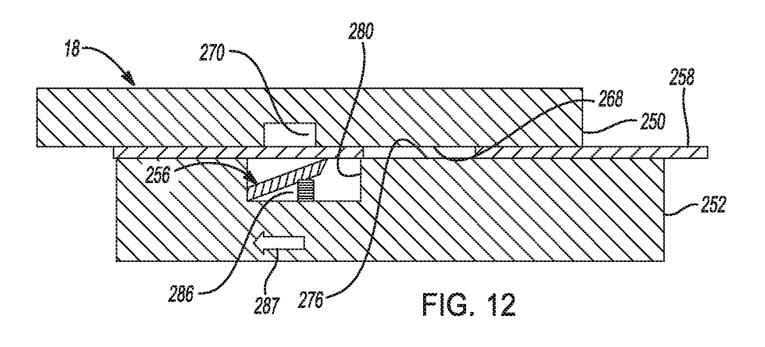
FIGS. 12-13 are section views of the selectable one-way clutch of FIG. 10.
Figure 13:
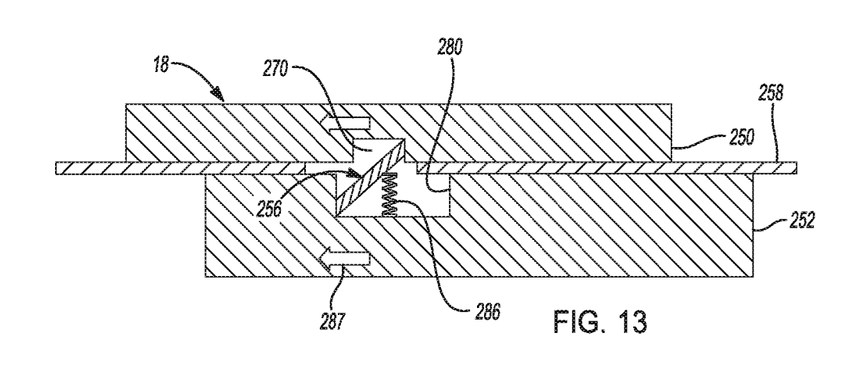

Referring now to FIGS. 10-13, an example implementation of the SOWC 18 of FIGS. 1-3 includes a notch plate 250, a pocket plate 252, a plurality of forward struts 254, a plurality of rearward struts 256, a selector plate 258, and a selector plate actuator 260. The notch plate 250 may be rigidly connected to the flex plate 14 of the engine 12 using, for example, fasteners. Alternatively, the notch plate 250 may be integral with the flex plate 14. The notch plate 250 has an inner radial surface 262, an outer radial surface 264, a first side surface 266, and a second side surface 268 opposite of the first side surface 266. The second side surface 268 defines a plurality of notches 270 (FIGS. 12 and 13).

The pocket plate 252 may be rigidly connected to the torque converter 20 or 44 using, for example, fasteners. Alternatively, the pocket plate 252 may be integral with an outer housing or shell of the torque converter 20 or 44. The pocket plate 252 has an inner radial surface 272, an outer radial surface 274, a first side surface 276, and a second side surface 278 opposite of the first side surface 266. The first side surface 276 of the pocket plate 252 faces the second side surface 268 of the notch plate 250. In addition, the first side surface 276 defines a plurality of pockets 280.

Each of the forward and rearward struts 254 and 256 is disposed in one of the pockets 280 and is pivotally connected to the pocket plate 252. In the example shown, each of the forward and rearward struts 254 and 256 includes a main body 282 and a pair of arms 284 projecting from the main body 282 to form a T shape. The arms 284 are secured within a corresponding one of the pockets 280 via a press fit that allows the main body 282 to pivot about a longitudinal axis of the arms 284. In other examples, the forward and rearward struts 254 and 256 may be pivotally connected to the pocket plate 252 using fasteners.

The SOWC 18 further includes a plurality of coil springs 286. Each of the coil springs 286 is disposed in one of the pockets 280 in the first side surface 276 of the pocket plate 252 and is captured between one of the forward and rearward struts 254 and 256 and the first side surface 276. Each of the coil springs 286 biases one of the forward and rearward struts 254 and 256 toward the second side surface 268 of the notch plate 250.

Each of the forward struts 254 is arranged within one of the pockets 280 such that the main body 282 thereof extends from the arms thereof in the first direction. Thus, when the forward struts 254 extend into and engage the notches 270 in the second side surface 268 of the notch plate 250, the forward struts 254 transfer torque from the notch plate 250 to the pocket plate 252 in the first (e.g., forward) direction. Conversely, each of the rearward struts 256 is arranged within one of the pockets 280 such that the main body 282 thereof extends from the arms thereof in the second direction. Thus, when the rearward struts 256 extend into and engage the notches 270 in the second side surface 268 of the notch plate 250, the rearward struts 256 transfer torque from the notch plate 250 to the pocket plate 252 in the second (e.g., rearward) direction.

The selector plate actuator 260 actuates the selector plate 258 between a first position (FIG. 12) and a second position (FIG. 13). When the selector plate 258 is in the first position, the selector plate 258 blocks the rearward struts 256 on the pocket plate 252 from pivoting into the notches 270 in the notch plate 250. When the selector plate 258 is in the second position, the selector plate 258 allows the rearward struts 256 on the pocket plate 252 to pivot into the notches 270 in the notch plate 250. Thus, the SOWC 18 is only operable to transfer torque in the second direction (labelled 287) when the selector plate 258 is in the second position.

The forward struts 254 pivot into the notches 270 in the notch plate 250 when the speed of the engine 12 is greater than or equal to the speed of the pump 30 of the torque converter 20 or 44. In turn, the SOWC 18 transfers torque from the engine 12 to the torque converter 20 or 44 in the first direction. The rearward struts 256 pivot into the notches 270 in the notch plate 250 when the selector plate 258 is in the second position and the speed of the pump 30 is greater than or equal to the speed of the engine 12. In turn, the SOWC 18 transfers torque from the torque converter 20 or 44 to the engine 12 in the second direction.

The selector plate actuator 260 may actuate the selector plate 258 between the first and second positions in response to a selector plate control signal output by a selector plate control module (not shown). In one example, the selector plate actuator 260 includes a servomotor 288 and an actuation arm 290 that extends radially inward from the servomotor 288, and the selector plate 258 defines a slot 292 that receives a portion of the actuation arm 290. The servomotor 288 rotates the actuation arm 290 in response to the selector plate control signal to move the selector plate in the circumferential direction of the SOWC 18 and therefore adjust the selector plate 258 between the first and second positions.

Figure 14:
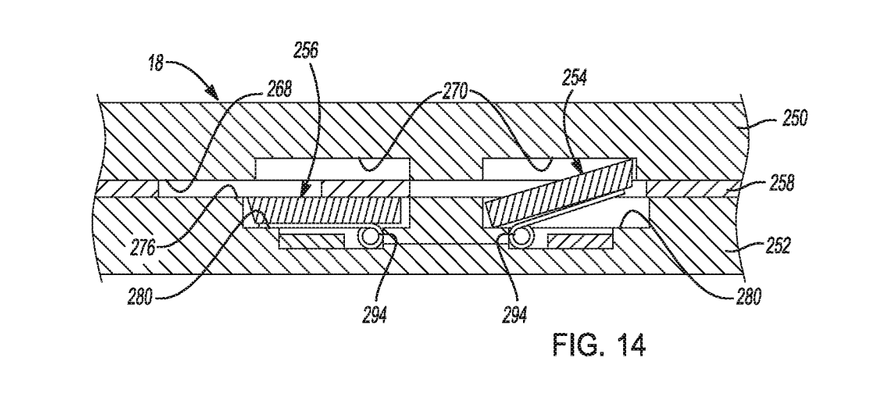
FIG. 14 is a section view of a selectable one-way clutch that is similar to the selectable one-way clutch of FIG. 10.

Referring now to FIG. 14, another example implementation of the SOWC 18 is shown that is similar or identical to the example implementation of FIGS. 10-13 except that the coil springs 286 have been replaced with clock springs 294. FIG. 14 shows one of the forward struts 254 on the pocket plate 252 engaging one of the notches 270 in the notch plate 250 while the selector plate 258 blocks one of the rearward struts 256 from engaging another one of the notches 270. In this configuration, the SOWC 18 transfers torque from the engine 12 to the torque converter 20 or 44 in the first direction.

The OWC 62 of FIGS. 4-6 may be similar or identical to the example implementations of the SOWC 18 discussed above except that the OWC 62 does not include the rearward struts 256, the selector plate 258, or the selector plate actuator 260. Thus, the OWC 62 is only operable to transfer torque from the engine 12 to the torque converter 20 or 44 in the first direction. The OWC 62 is not operable to transfer torque from the torque converter 20 or 44 to the engine 12 to in the second direction. In various implementations, pawls, rollers, or dog clutch components are used in place of the forward and rearward struts 254 and 256 in the SOWC 18, or in place of the forward struts 254 in the OWC 62, to connect the pocket plate 252 to the notch plate 250.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A powertrain system comprising:
   a flex plate configured to be connected to a crankshaft of an engine;
   a transmission input shaft;
   a torque coupling connecting the transmission input shaft to the flex plate while allowing slip between the transmission input shaft and the flex plate;
   a one-way clutch configured to couple the flex plate to the torque coupling; and
   a first damper assembly coupling the flex plate to the one-way clutch and configured to inhibit vibration transmission from the flex plate to the one-way clutch, wherein:
   the one-way clutch is a selectable one-way clutch;
   the selectable one-way clutch is actuatable between a first configuration and a second configuration;
   in the first configuration, the selectable one-way clutch transfers torque from the flex plate to the torque coupling in a first direction and does not transfer torque from the torque coupling to the flex plate in a second direction that is opposite than the first direction; and
   in the second configuration, the selectable one-way clutch transfers torque from the flex plate to the torque coupling in the first direction and transfers torque from the torque coupling to the flex plate in the second direction.

2. The powertrain system of claim 1 further comprising a motor-generator connected to an input side of the torque coupling.

3. The powertrain system of claim 1 wherein the first damper assembly includes:
   an input drive plate connected to the flex plate;
   a spring retainer plate connected to the one-way clutch; and
   a coil spring captured between the input drive plate and the spring retainer plate and configured to transfer torque from the input drive plate to the spring retainer plate.

4. The powertrain system of claim 3 wherein:
   the input drive plate includes radially extending arms; and
   the spring retainer plate retains the coil spring between the radially extending arms of the input drive plate.

5. The powertrain system of claim 1 wherein the torque coupling is a torque converter that includes a pump and a turbine that are hydraulically coupled to one another, the powertrain system further comprising a second damper assembly coupling the pump of the torque converter to the transmission input shaft and configured to inhibit vibration transmission from the pump to the transmission input shaft.

6. The powertrain system of claim 5 wherein:
   the torque converter further includes a torque converter clutch configured to mechanically couple the pump of the torque converter to the transmission input shaft; and
   the second damper assembly couples the torque converter clutch to the transmission input shaft.

7. The powertrain system of claim 1 wherein the one-way clutch is configured to couple the flex plate to the torque coupling when a speed of the engine is greater than or equal to a speed of a component on an input side of the torque coupling.

8. A powertrain system comprising:
   a flex plate configured to be connected to a crankshaft of an engine;
   a transmission input shaft;
   a torque coupling connecting the transmission input shaft to the flex plate while allowing slip between the transmission input shaft and the flex plate;
   a one-way clutch configured to couple the flex olate to the torque coupling, wherein the one-way clutch:
   transfers torque from the flex plate to the torque coupling in a first direction; and
   does not transfer torque from the torque coupling to the flex plate in a second direction that is opposite than the first direction;
   a first damper assembly coupling the flex plate to the one-way clutch and configured to inhibit vibration transmission from the flex plate to the one-way clutch; and
   a friction clutch connected to the flex plate and the torque coupling in parallel with the one-way clutch and configured to couple the flex plate to the torque coupling when the friction clutch is engaged.

9. The powertrain system of claim 8 further comprising a second damper assembly coupling an input side of the torque coupling to the transmission input shaft and configured to inhibit transmission of vibration from the engine to the transmission input shaft.

10. The powertrain system of claim 9 wherein:
the torque coupling is a torque converter that includes a pump, a turbine hydraulically coupled to the pump, and a torque converter clutch configured to mechanically couple the pump of the torque converter to the transmission input shaft; and
the second damper assembly couples the torque converter clutch to the transmission input shaft.

11. The powertrain system of claim 8 further comprising a motor-generator connected to an input side of the torque coupling.

12. The powertrain system of claim 8 wherein the first damper assembly includes:
an input drive plate connected to the flex plate;
a spring retainer plate connected to the one-way clutch; and
a coil spring captured between the input drive plate and the spring retainer plate and configured to transfer torque from the input drive plate to the spring retainer plate.

13. The powertrain system of claim 12 wherein:
the input drive plate includes radially extending arms; and
the spring retainer plate retains the coil spring between the radially extending arms of the input drive plate.

14. The powertrain system of claim 8 wherein the torque coupling is a torque converter that includes a pump and a turbine that are hydraulically coupled to one another, the powertrain system further comprising a second damper assembly coupling the pump of the torque converter to the transmission input shaft and configured to inhibit vibration transmission from the pump to the transmission input shaft.

15. The powertrain system of claim 14 wherein:
the torque converter further includes a torque converter clutch configured to mechanically couple the pump of the torque converter to the transmission input shaft; and
the second damper assembly couples the torque converter clutch to the transmission input shaft.

16. The powertrain system of claim 8 wherein the one-way clutch is configured to couple the flex plate to the torque coupling when a speed of the engine is greater than or equal to a speed of a component on an input side of the torque coupling.

17. The powertrain system of claim 8 wherein the friction clutch is connected to the flex plate and the torque coupling in parallel with both the one-way clutch and the first damper assembly.

18. A powertrain system comprising:
a flex plate configured to be connected to a crankshaft of an engine;
a transmission input shaft;
a torque converter connecting the transmission input shaft to the flex plate and including a pump and a turbine that is hydraulically coupled to the pump;
a motor-generator connected to the pump of the torque converter;
a one-way clutch configured to couple the flex plate to the torque converter and a damper assembly coupling the pump of the torque converter to the transmission input shaft and configured to inhibit vibration transmission from the pump to the transmission input shaft, wherein:
the one-way clutch is a selectable one-way clutch;
the selectable one-way clutch is actuatable between a first configuration and a second configuration;
in the first configuration, the selectable one-way clutch transfers torque from the flex plate to the torque converter in a first direction and does not transfer torque from the torque converter to the flex plate in a second direction that is opposite than the first direction; and
in the second configuration, the selectable one-way clutch transfers torque from the flex plate to the torque converter in the first direction and transfers torque from the torque converter to the flex plate in the second direction.

19. The powertrain system of claim 18 wherein:
the torque converter further includes a torque converter clutch configured to mechanically couple the pump of the torque converter to the transmission input shaft; and
the damper assembly couples the torque converter clutch to the transmission input shaft.

* * * * *